(12) United States Patent
Busse et al.

(10) Patent No.: US 6,759,813 B2
(45) Date of Patent: Jul. 6, 2004

(54) OPERATING CIRCUIT FOR A DISCHARGE LAMP WITH FREQUENCY-VARIABLE IGNITION

(75) Inventors: Olaf Busse, Munich (DE); Klaus Orth, Munich (DE)

(73) Assignee: Patent-Treuhand-Gesellschaft für elektrische Glühlampen mbH, Munich (DE)

( * ) Notice: Subject to any disclaimer, the term of this patent is extended or adjusted under 35 U.S.C. 154(b) by 0 days.

(21) Appl. No.: 10/359,134

(22) Filed: Feb. 6, 2003

(65) Prior Publication Data

US 2003/0151378 A1 Aug. 14, 2003

(30) Foreign Application Priority Data

Feb. 13, 2002 (DE) .......................... 102 05 896

(51) Int. Cl.$^7$ .............................. H05B 37/02
(52) U.S. Cl. ................. 315/291; 315/224; 315/307
(58) Field of Search ..................... 315/209 R, 119, 315/215, 224, 244, 291, 307, 360, DIG. 7

(56) References Cited

U.S. PATENT DOCUMENTS

| | | | | |
|---|---|---|---|---|
| 5,144,207 A | * | 9/1992 | Brunson .................... 315/291 |
| 5,705,894 A | * | 1/1998 | Krummel .................... 315/119 |
| 6,525,492 B2 | * | 2/2003 | Ribarich .................... 315/291 |
| 6,541,923 B1 | * | 4/2003 | Tyson ........................ 314/224 |
| 2002/0067145 A1 | * | 6/2002 | Ribarich .................... 315/291 |

* cited by examiner

Primary Examiner—Don Wong
Assistant Examiner—Jimmy T Vu

(57) ABSTRACT

A novel operating circuit for a low-pressure gas discharge lamp 1 in the case of which a digital controller 12 is designed such that by gradually lowering the operating frequency in the ignition procedure it initiates shutdown operations of a safety shutdown device for excessive currents through a lamp inductor 10 in order thereafter to increase the operating frequency somewhat. It is possible overall in this way to achieve an ignition, for example by repeated pulsed ignition operations as far as shutdown operations, or else by a continuous ignition operation at a minimum frequency at which no shutdown operation occurs. The invention has the advantage of being insensitive to temperature fluctuations and component tolerances and, moreover, of permitting the lamp inductor 10 to have comparatively small dimensions.

6 Claims, 4 Drawing Sheets

ОPERATING CIRCUIT FOR A DISCHARGE LAMP WITH FREQUENCY-VARIABLE IGNITION

TECHNICAL FIELD

The present invention relates to an operating circuit for a discharge lamp, in particular a low-pressure discharge lamp.

Such operating circuits regularly have AC voltage generators with the aid of which an AC voltage with a specific frequency is applied to electrodes of the discharge lamp in order, on the one hand, to ignite the discharge lamp and, on the other hand, to maintain the operation after the ignition. The details of such operating circuits have been known in general for a long time and need not be explained in detail here.

PRIOR ART

In particular, it is already known to design the operating circuits such that they carry out the ignition operation with the aid of a resonant peak in a resonant circuit which is connected to the discharge lamp. For this purpose, the frequency for ignition is set to a value in the vicinity of the resonance of the resonant circuit (which value is mostly increased with reference to the continuous operating frequency to be applied later). The resonant circuit generates the voltage amplitudes required for the ignition by resonance effects.

It is already known, furthermore, to build into operating circuits for discharge lamps safety shutdown devices which are designed so as to shut down the supply power in the event of impermissibly high supply currents of the AC voltage generator. The aim of this is to avoid damage to the operating circuit and the lamp and/or to avoid risks.

SUMMARY OF THE INVENTION

Starting from the prior art as outlined, the invention is based on the problem of specifying an operating circuit improved with regard to the ignition of the discharge lamp.

To this end, according to the invention there is provided for a discharge lamp an operating circuit which has an AC voltage generator which can generate an AC supply power with different frequencies for the purpose of igniting and operating the discharge lamp, the operating circuit being designed in order to ignite the discharge lamp at a frequency at which a resonant peak of a resonant circuit connected to the discharge lamp occurs, and having a safety shutdown device which shuts down the supply power at a threshold value in the region of impermissibly high supply currents of the AC voltage generator.

By contrast with the prior art, the invention does not proceed from a permanently prescribed ignition frequency, but gradually varies the frequency, starting from an initial, presumably excessive frequency, to lower frequencies, the described safety shutdown device monitoring the supply current of the AC generator. If adequate excitation of the resonant circuit and ignition of the lamp occur during the reduction of the frequency, the resonant frequency of the resonant circuit is sharply reduced because of the change in the electric properties of the discharge lamp. An impermissibly high supply current will not then normally occur. However, should an excessively high supply current occur nevertheless as operation proceeds, it can certainly be provided according to the invention that the safety shutdown device then responds again. However, this then would essentially have nothing to do with the ignition procedure as such which is addressed by the invention.

On the other hand, should impermissibly high supply currents occur during the lowering of frequency owing to an excessively close approach to the resonant frequency of the resonant circuit (in which case the discharge lamp would then not yet have been ignited), the safety shutdown device then responds according to the invention.

It is essential for the operating circuit to be designed such that it does not now stop operating completely, for example, but rather starts a new attempt at ignition with a frequency (shutdown frequency in what follows) which is increased with reference to the frequency at which the shutdown has been performed. The invention does not stipulate in general how this is performed in detail. A variety of preferred variants are still to be outlined below. However, it is essential that the operating circuit is initially remote once again from the shutdown frequency.

The operating circuit according to the invention is therefore capable of, as it were, "feeling its way" to the resonance of the resonant circuit, the safety shutdown circuit preventing damage. This has a consequence that fluctuations in the resonant frequency do not lead to ignition interference. It is thereby possible, in particular, to greatly reduce the sensitivity of the operating circuit to interference and temporal or temperature-dependent variations in the characteristics of the various circuit constituents. This enhances the reliability, for one thing, but also has marked economic advantages owing to the reduced requirements when selecting components.

Conventional low-pressure discharge lamps are regularly connected in series with a so-called lamp inductor which is required because of the negative values, occurring in these lamps, in the derivative of the current-voltage characteristic. However, the invention is certainly not restricted to such discharge lamps. It does, however, offer great advantages in the use of lamp inductors. Specifically, one difficulty in the prior art consists in that the lamp inductor becomes saturated at specific current values. The saturation of the lamp inductor can lead to an instability in the operating circuit which cannot be tolerated. This is the main reason for the use of safety shutdown devices in conventional low-pressure discharge lamps.

The saturation current of a lamp inductor is, however, relatively strongly dependent on temperature, and so the lamp inductor must be of relatively large design as a precaution in view of possible high temperatures. The point is that it would be necessary on the other hand to generate relatively high ignition voltages with the operating circuit in order to ignite the discharge lamp given a conventionally permanently prescribed ignition frequency, in order to ensure reliable ignition even at low temperatures. The high ignition voltages are necessarily associated with relatively high lamp inductor currents. This leads overall to the fact that excessively large lamp inductors are built up for reasons of reliability and safety while not being necessary at all for most applications. This is firstly associated with disadvantages regarding overall size and overall weight of the operating circuit, and on the other hand also with cost disadvantages, of course.

Comparatively smaller lamp inductors can be constructed, however, when the function of the safety shutdown device is integrated, according to the invention, to a certain extent in the normal ignition procedure. To be precise, in the case of the invention the occurrence of safety shutdown devices in the ignition procedure does not form a problematical exceptional case which entails absence of successful ignition, but forms a procedure that is integrated in to the normal functional cycle of the operating circuit.

The operating circuit is advantageously designed such that once a shutdown has been performed following a response of the safety shutdown device, it gradually lowers the supply frequency again. In this case, it proceeds from a starting frequency that is increased with reference to the shutdown frequency. The ignition procedure then therefore has a basically iterative character.

There are two respectively advantageous preferred variants in this case:

Firstly, the operating circuit can be designed such that during the renewed attempt at ignition it lowers the frequency only down to a minimum frequency that is slightly increased with reference to the last shutdown frequency. However, in this case the safety shutdown device remains active, and therefore shuts down again, if appropriate. The minimum frequency is therefore not necessarily reached. Should a shutdown have occurred once again, the procedure is repeated, that is to say the frequency is gradually lowered again—specifically, if no shutdown occurs, once again only down to a frequency that is slightly increased with reference to the last, that is to say second, shutdown frequency.

In this way, the operating circuit therefore feels upward in small steps as it were, starting from a shutdown frequency once detected, to higher frequencies until a minimum frequency is found at which no further safety shutdown occurs. The ignition procedure can then be continued with this minimum frequency if the ignition has not already been performed. Owing to the prior sampling of the safety shutdown unit, the minimum frequency is at an optimized level, that is to say one that is as low as possible, and is therefore as close as possible to the resonant frequency of the resonant circuit. It is thereby possible to generate large ignition voltages without, finally, risking problematic saturations of the lamp inductor. Analogous advantages apply whenever the safety shutdown device should be provided for reasons other than of avoiding lamp inductor saturations.

The other preferred configuration provides that the minimum frequency down to which the frequency can be reduced in the absence of a safety shutdown unit remains at a specific value from the very first. Thus, when safety shutdowns already occur at this minimum frequency or at frequencies that are increased with reference thereto, these safety shutdowns are repeated iteratively. Since the safety shutdown device is to respond so quickly that damage is avoided, there is no fundamental problem in this. Thus, this gives rise to repeated injection of ignition pulses with amplitudes so high that they are repeatedly interrupted by the safety shutdown device. However, the lamp will normally be ignited because of the repetition of these ignition pulses, because preionization has already occurred in the discharge medium. Thus, given repetition of the attempts at ignition, ignition will then occur for which no further safety shutdown takes place. Both variants are represented in more detail in the exemplary embodiments.

It is preferred, furthermore, to limit the ignition procedure overall, and this can be performed according to the invention by means of a running variable. The latter is incremented during the ignition procedure as long as no ignition is performed. Should it achieve a specific maximum value before the discharge lamp ignites, the attempts at ignition are interrupted, in which case it would also be possible to generate a fault message, if appropriate. This running variable can be implemented in different ways. It could, for example, be increased by a value with each shutdown operation, or be associated with the individual frequency lowering steps provided that the frequency lowering is performed in steps. It is also possible for it to be a simple time variable.

The essential application of the invention relates to half-bridge oscillators as AC voltage generators. Such half-bridge oscillators are known per se. They have two switching transistors whose switching operation must be suitably clocked. This is preferably performed in the case of the invention by a digital control circuit which specifies the frequencies and must therefore be configured in the way according to the invention. In particular, as digital control circuit the operating circuit can have a so-called microcontroller with a microprocessor, as is illustrated in the exemplary embodiments.

The threshold value for the response of the safety shutdown device can be relatively high when said device responds with adequate speed. In particular, in the case of use of a lamp inductor it can be far above the nominal saturation current of the lamp inductor at room temperature. The result of this once again, in particular, is insensitivity to fluctuations in component parameters or in the operating or ambient temperatures. Since saturation of the lamp inductor has the effect in any case that there is a further increase in the lamp inductor current as a consequence of the temperature increase and/or of the inductance being reduced by the saturation, even a current peak not yet leading per se to the threshold value leads as a rule directly to growing current strengths which then also pass into the range of a threshold value set relatively high. For example, it is sensible to have threshold values 1.3 times, and preferably above 1.4 or above 1.5 times the nominal saturation current of the lamp inductor at room temperature. It is preferred, furthermore, for the threshold value not to be higher than 2.5 times, preferably 2 times, with particular preference 1.8 times the nominal saturation current.

The frequency of the supply power made available by the operating circuit is advantageously varied further after a successful ignition, specifically such that it is possible to regulate to a prescribed supply current. Thus, the variability, provided by the microcontroller, for example, in the operating frequency is then also advantageous for reasons independent of the ignition procedure per se.

Particularly in the case of a digital frequency operation in a digital control circuit, the gradual lowering in frequency will necessarily always take place stepwise. In order not to configure the sequence of the inventive ignition to be unnecessarily complicated, and to ensure a relatively fast sequence, the steps in the lowering of the frequency can be selected in a suitable way in this way. This frequency resolution is also therefore rationally not too fine, because it is related to the internal maximum clock frequency of the digital controller. The internal clock frequency is preferably between 10 MHz and 20 MHz. Typical operating frequencies of a half-bridge oscillator are approximately between 35 kHz and 105 kHz. The frequency resolution, that is to say the relative step width, in the case of the lowering of the frequency is therefore preferably in the range of approximately 0.2–1%.

BRIEF DESCRIPTION OF THE DRAWINGS

The invention is explained in more detail below with the aid of exemplary embodiments. The individual features disclosed in this case can also be essential to the invention in other combinations. Moreover, it is explicitly stated that the invention has both a device character and a method character, and what has been said above and the following disclosure are to be understood with regard to both categories.

BEST MODE FOR CARRYING OUT OF THE INVENTION

Figure 1:
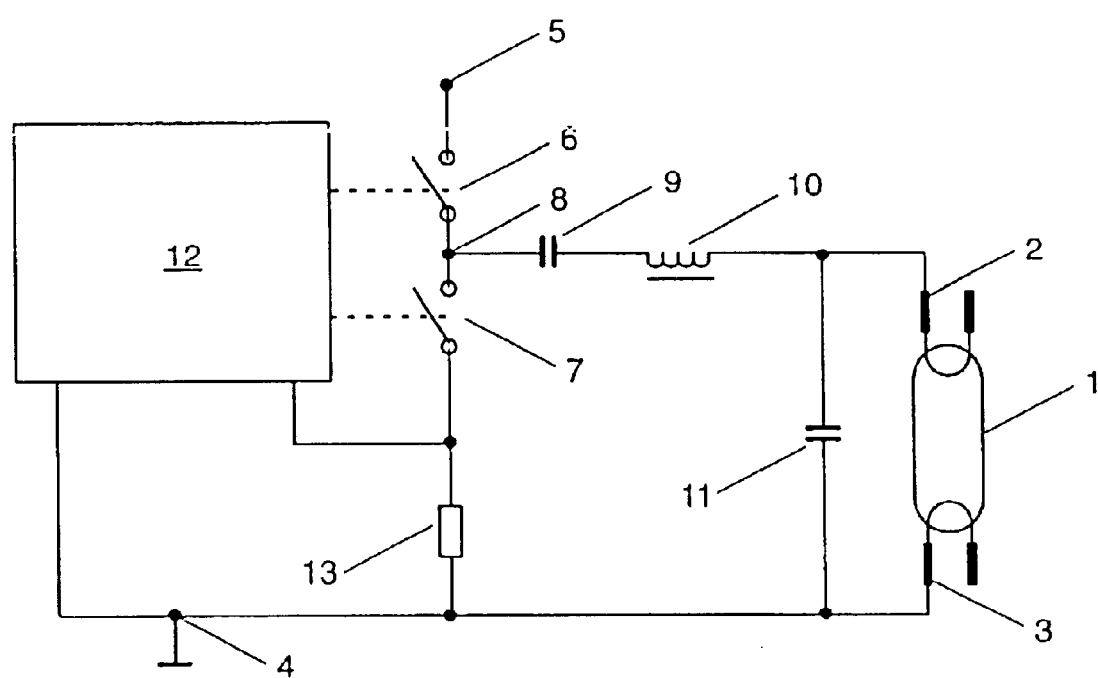
FIG. 1 shows a schematic block diagram of an operating circuit according to the invention.

In FIG. 1, the reference numeral 1 denotes a low-pressure discharge lamp with two preheatable incandescent filament electrodes 2 and 3. An oscillator half bridge known per se with two switching transistors 6 and 7 is situated between a frame terminal 4 and an intermediate circuit supply voltage 5. A center tap 8 can be switched to and fro between the intermediate circuit supply voltage and the frame potential by an alternating switching operation of the two switching transistors 6 and 7. As a result, a radio-frequency supply voltage for the discharge lamp 1 can be generated from the rectified intermediate circuit supply voltage which is present at the terminal 5 and is obtained from a system voltage via an otherwise conventional rectifier with the aid of a smoothing circuit.

A so-called coupling capacitor 9, a lamp inductor 10 and a discharge lamp 1 are connected in series between the frame terminal 4 and the center tap 8. The coupling capacitor 9 serves to decouple the discharge lamp 1 from DC components; the lamp inductor 10 serves, in particular, to compensate the in part negative derivative of the current-voltage characteristic of the discharge lamp 1. Both circuit components are generally known in this function and need not be explained in more detail here.

The same holds for a resonance capacitor 11 which is in parallel with the discharge lamp 1 and likewise in series to the coupling capacitor 9 and the lamp inductor 10, and which serves for generating ignition voltage amplitudes with resonant peaks for the purpose of igniting the discharge lamp 1.

As described so far, the operating circuit is of entirely conventional construction. However, as indicated by dashes in FIG. 1, the control terminals of the switching transistors 6 and 7 are controlled by control signals from a digital control circuit 12. The digital control circuit 12 also detects via a measuring shunt 13 a signal indicating the level of the current through the lamp inductor 10, and has a safety shutdown device responding to this current.

The digital control circuit 12 is a specifically adapted microcontroller which includes a microprocessor and further auxiliary circuits. This control circuit 12 is described in more detail below in conjunction with its function. It is clear to the person skilled in the art that a digital circuit programmed in a way known per se is involved in this case.

Figure 2:
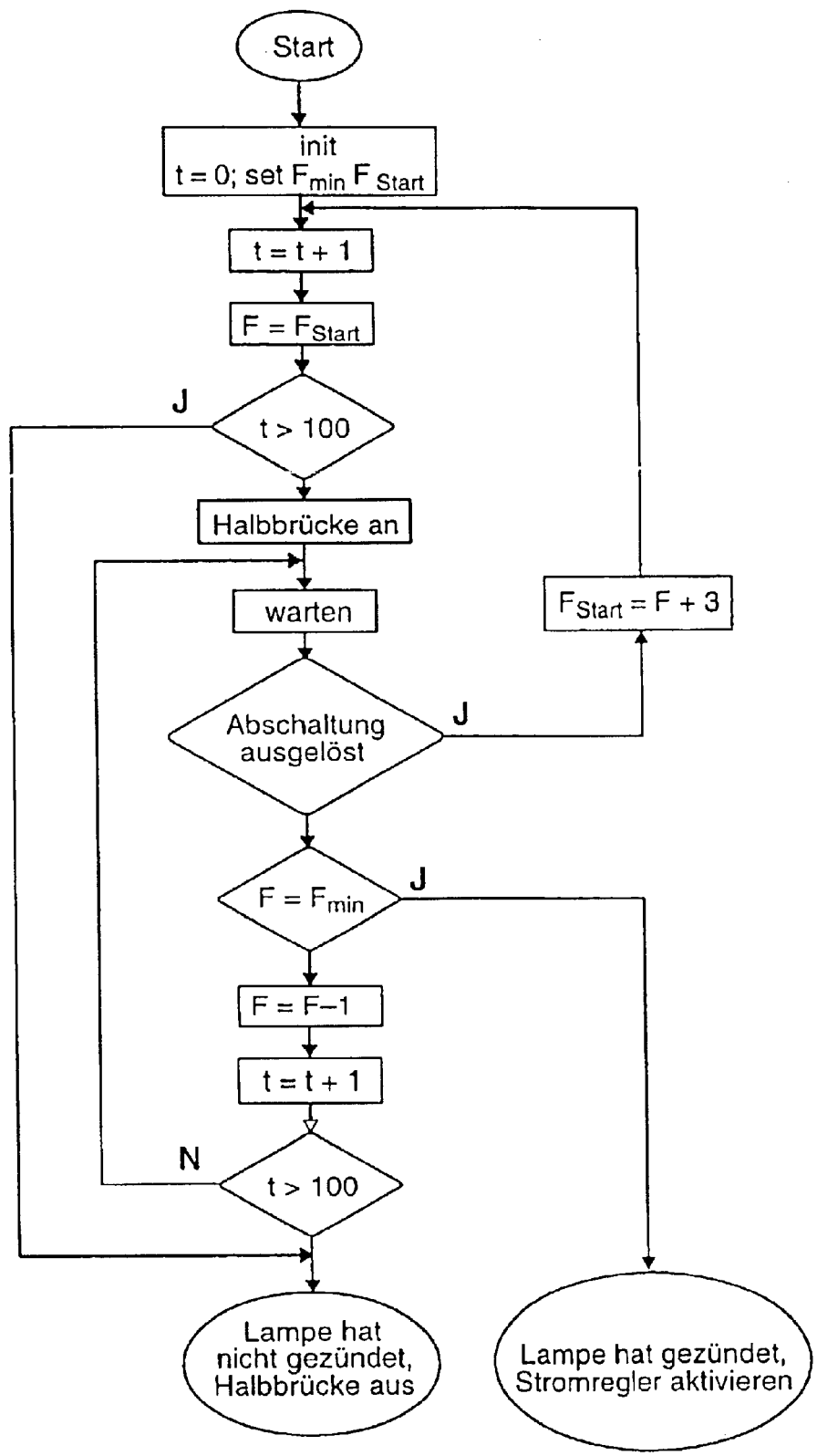
FIG. 2 shows a flowchart illustrating the function of the operating circuit from FIG. 1 according to a first exemplary embodiment.

FIG. 2 shows the functional cycle in accordance with a first exemplary embodiment. According to the start at the top of the flowchart in FIG. 2, in this exemplary embodiment a running variable t is firstly set to 0 in an initiation operation after the start, and suitable values are fixed for a minimum frequency $F_{min}$ and a maximum frequency $F_{start}$. In this case, $F_{start}$ is so large that it is substantially above the supposed suitable frequency for igniting the discharge lamp 1, that is to say, in particular, above the resonant frequency of the resonant circuit formed by the coupling capacitor 9, the lamp inductor 10 and the resonance capacitor 11. The minimum frequency $F_{min}$ is lower than the assumed resonant frequency.

In a further step, the running variable t is increased by 1, thus to the value 1 in the first pass, and the current operating frequency F of the digital controller, that is to say the clock frequency of the drive of the switching transistors 6 and 7 and thus the frequency of the supply power for the discharge lamp 1, is set to the maximum value $F_{start}$.

A subsequent interrogation of the running variable t demonstrates that the latter is smaller than a maximum value of the running variable, here 101, and so in a next step the digital control circuit 12 puts the half-bridge oscillator with the switching transistors 6 and 7 into operation with the frequency F. Waiting then takes place for a specific period which is greater than the response time of the safety shutdown device included in the digital control circuit 12, and thereafter it is asked whether the safety shutdown unit has been triggered or not. The safety shutdown device typically responds in a range of one oscillation, that is to say within 20 $\mu$s, for example, and so the waiting time can be in the range of less than 10 $\mu$s. Here, the waiting time is approximately 250 $\mu$s in order also to take account of delayed response processes (inductor warming). The required calculations are easy to carry out with this value. A shorter value is not mandatory, because of the fast reaction of the safety shutdown device.

If the safety shutdown device is not triggered, something which is to be expected because of the suitably selected value for $F_{start}$, the process sequence passes, via an intermediate interrogation as to whether the current frequency corresponds to the minimum frequency, something which is denied in the present case, of course, to a next step in which the current frequency is lowered by a step unit. This example proceeds from an internal operating frequency of the digital control circuit 12 of the order of magnitude of 10 MHz, and thus a frequency resolution of approximately 100 ns. This corresponds to steps of the order of magnitude of 0.5% in the case of a typical operating frequency of approximately 50 kHz for the discharge lamp 1.

Furthermore, the running variable t is increased by 1, that is to say to 2. Since t continues to be smaller than 100, there is a move to the top again via the negative output from the following interrogation, and so there is a wait over the waiting time as to whether the safety shutdown device has been triggered. This sequence is repeated with stepwise lowering of the actual frequency and an increase in the running variable t until one of three possibilities occurs:

Firstly, a shutdown operation could have occurred in the case of a specific frequency F. The corresponding interrogation is then left to the right to the yes output, such that the new maximum and starting frequency $F_{start}$ is fixed to a value of three frequency steps above this shutdown frequency. The running variable t is then increased by 1 again, and the sequence already described is repeated starting from the start frequency lying three step units above the shutdown frequency. The sequence now therefore feels iteratively to repeatedly new shutdown operations, restarting in each case after a shutdown operation three frequency step units above the current shutdown frequency, which can certainly change during these iterative repetitions.

Secondly, a lamp ignition entailing an immediate reduction in the resonant frequency should be performed during this iterative repetition. This is due to the substantial lowering of the lamp impedance, which is in parallel with the resonance capacitor 11. Consequently, no further shutdown operation now occurs, because resonant peaks are absent from the lamp inductor current. Consequently, the interrogation, arranged approximately in the middle in FIG. 2, concerning the triggering of the shutdown is decided with no. This is followed by the interrogation as to whether the current operating frequency is at the minimum frequency $F_{min}$. This is presumably not the case with the situation outlined, and so the operating frequency is further reduced until the value $F_{min}$ is reached after an appropriate number of cycles. It is then concluded therefrom by answering the interrogation in the affirmative that the lamp 1 has been ignited, and so the digital control circuit 12 now switches over into a continuous operating mode. The frequency F is varied in this continuous operating mode such that it is regulated to a constant current by the lamp inductor 10.

Thirdly, however, it could also happen that shutdowns keep occurring, that is to say, there is no ignition of the lamp, until the running variable t has reached the value 101. A deduction is then drawn by the yes output on the corresponding interrogation step in the upper third of FIG. 2 that it was not possible to ignite the lamp. The half-bridge oscillator is thereby switched off, and a fault signal is generated if necessary.

A further possibility for switching off because of the lack of normal ignition results when a reduction in the frequency to $F_{min}$ has not occurred within the range up to t=100. In the case of this exemplary embodiment, a spacing of approximately 20–30 frequency steps between $F_{start}$ and $F_{min}$ is typical, and so the situation $F=F_{min}$ should have occurred in a normal sequence before the situation t=101 is reached. If this does not happen, that is to say if t=101 for $F>F_{min}$, a fault is likewise present and so the discharge lamp 1 is not operated further, for safety reasons. The maximum value for t must therefore be selected to be sufficiently large with regard to the spacing between $F_{min}$ and $F_{start}$.

Typical numerical values can be a few 100 shutdown operations over a total period of approximately up to 100–200 ms. There is thus sufficient time left for the waiting time, already discussed, for the shutdown operation.

Figure 4:
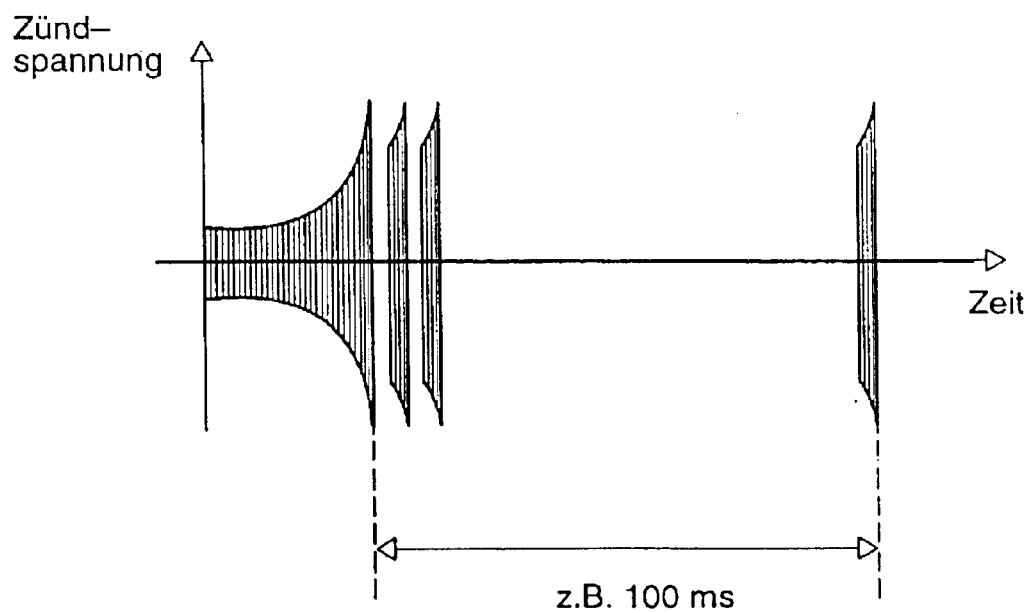
FIG. 4 shows a schematic example of a typical time profile of the ignition voltage in the case of the first exemplary embodiment.

FIG. 4 shows a schematic example of a typical profile of the ignition voltage against the time axis with, by way of example, approximately 100 sequential ignition pulses. However, FIG. 4 shows the situation in which no ignition has occurred after approximately 100 ms. Thus, here the flowchart from FIG. 2 has finally led to the result that the value 101 has been seen in the interrogation, arranged in the upper third of FIG. 2, of the level of the variable t, and so the control circuit 12 has shut down.

Figure 3:
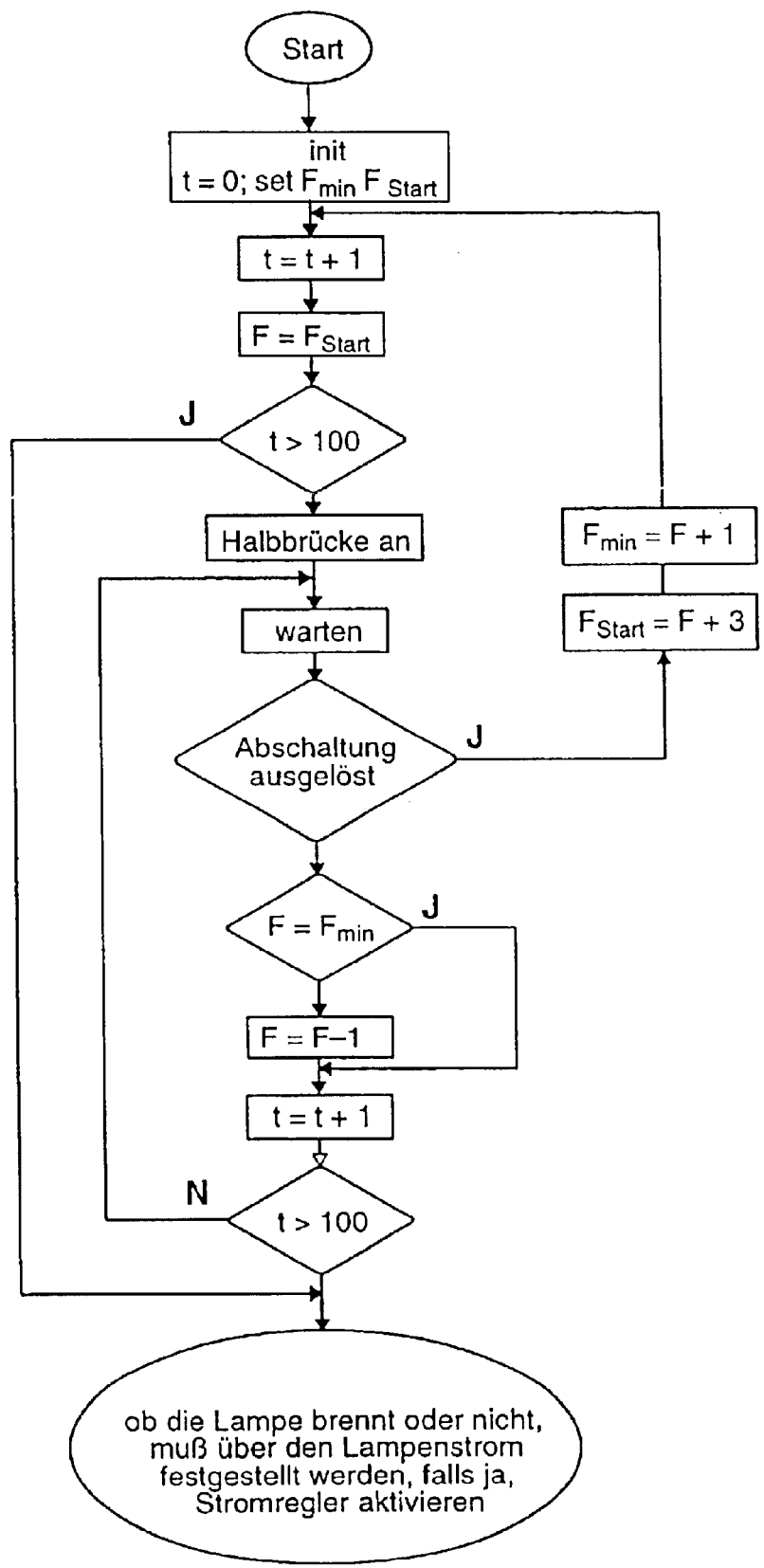
FIG. 3 shows a flowchart illustrating the function of the operating circuit from FIG. 1 according to a second exemplary embodiment.
Figure 5:
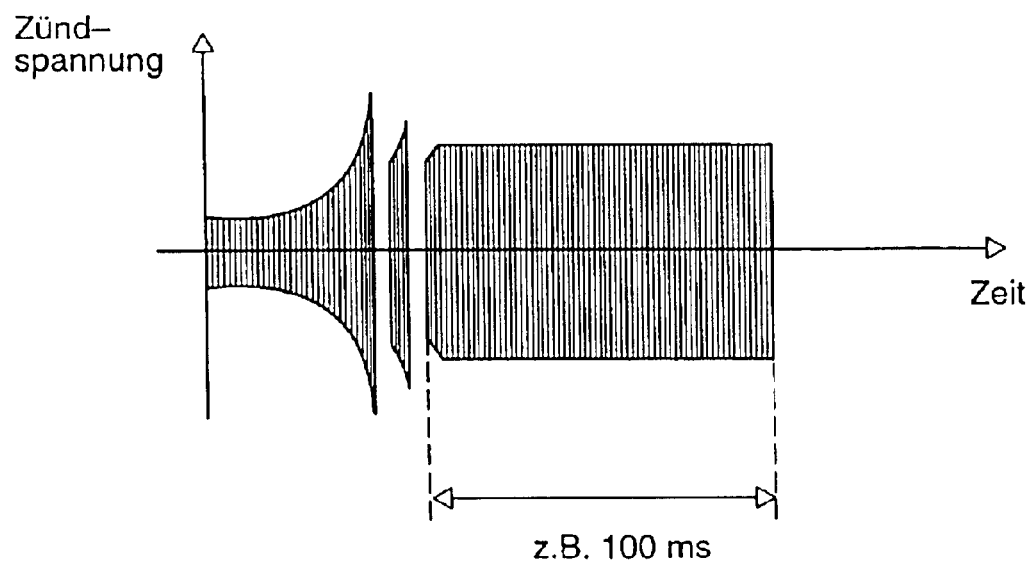
FIG. 5 shows a schematic example of a typical time profile of the ignition voltage in the case of the second exemplary embodiment.

The second exemplary embodiment is illustrated in more detail in FIG. 3 and in FIG. 5. The difference between FIGS. 2 and 3 consists initially in that given an affirmative response to the interrogation as to the presence of a safety shutdown approximately in the middle of FIGS. 2 and 3, not only $F_{start}$ is fixed by three steps higher with reference to the shutdown frequency, but $F_{min}$ is also fixed at one step above the shutdown frequency. Thus, when no new shutdown operation occurs because of the switching frequency increased by three step widths with reference to the shutdown frequency, the negative response to the interrogation of the shutdown leads to a comparison of the actual frequency F with a value of $F_{min}$ which lies above the preceding shutdown frequency. However, should a further shutdown occur in the case of the renewed pass through the upper loop, $F_{start}$ is increased by three steps above the shutdown frequency in each case until this no longer happens.

In the lower part, adjoining the negative response of the shutdown interrogation, of the flowchart from FIG. 3, a comparison is now made with $F_{min}$, and in the event of a negative response F is firstly lowered by one step and t is increased by one step. As long as the maximum value for the running variable t has not yet been reached, this leads to the waiting position situated above the shutdown interrogation. Thus, if success is now achieved in reaching $F_{min}$, without a shutdown occurring at $F_{min}$, an ignition must be performed within the time up to t=100. If no ignition is performed, this cannot be determined via the flowchart from FIG. 3. The control circuit 12 therefore has to determine by measuring the lamp current whether the ignition has been performed.

Should a shutdown occur, before or upon $F_{min}$ being reached, $F_{start}$ and $F_{min}$ are increased again by three steps and one step, respectively, above the shutdown frequency, and so the procedure is repeated as already described. When shutdowns occur too frequently, the result of this is that the value t=101 is reached in the upper loop in FIG. 3. This likewise terminates the sequence of the flowchart.

Thus, the aim in this exemplary embodiment is a situation in which it is possible to determine for $F_{min}$ a value which is one step above a frequency at which a shutdown has occurred. In this case, however, the aim is precisely that no more shutdowns be performed at $F_{min}$. $F_{min}$ is therefore the minimum possible continuous frequency in the ignition mode. This continuous frequency is then held until t has reached the value 101. This is expressed in FIG. 5 in that after a finite number of attempts a continuous ignition operation is performed which can likewise be of the order of magnitude of 100 ms. In the examples illustrated, the threshold value of the safety shutdown device in the control circuit 12 is, moreover, 1.6 times the nominal saturation current of the lamp inductor 10 at room temperature.

What is claimed is:

1. An operating circuit for a discharge lamp (1), the operating circuit comprising:
   an AC voltage generator (6, 7) operable to generate an AC supply power at a variable frequency (F) for the purpose of igniting and operating the discharge lamp (1);
   a resonant circuit (9, 10, 11) coupled between the AC voltage generator and the discharge lamp;
   a control circuit (12) coupled to the AC voltage generator and operable to drive the AC voltage generator, the control circuit being further operable to monitor a supply current in the AC voltage generator and to shut down the AC voltage generator in response to the supply current exceeding a threshold current value; and
   wherein the AC voltage generator and the control circuit are further operable:
   (i) to gradually lower the frequency (F) from a starting frequency ($F_{start}$) in order to attempt to ignite the discharge lamp at a frequency at which a resonant peak of the resonant circuit occurs;
   (ii) if the control circuit shuts down the AC voltage generator, to make a new attempt to ignite the lamp by restarting the AC voltage generator and then gradually lowering the frequency (F), wherein during the new attempt to ignite the lamp the starting frequency ($F_{start}$) is set with reference to the frequency at which shut down occurred;

(iii) if the control circuit does not shut down the AC voltage generator, and if the frequency (F) is greater than a prescribed minimum frequency ($F_{min}$), to lower the frequency (F) and continue to attempt to ignite the lamp;

(iv) if the control circuit does not shut down the AC voltage generator, and if the frequency is less than or equal to the prescribed minimum frequency ($F_{min}$), to conclude that the lamp has been ignited and to provide regulated current for operating the lamp;

(v) to increment a running variable (t) for each attempt to ignite the lamp; and (vi) in response to the running variable (t) reaching a prescribed maximum value, to refrain from any further attempt to ignite the lamp.

2. The operating circuit of claim 1, wherein the AC voltage generator and the control circuit are further operable:

if the control circuit shuts down the AC voltage generator, to make a new attempt to ignite the lamp by restarting the AC voltage generator and then gradually lowering the frequency (F), wherein during the new attempt to ignite the lamp the starting frequency ($F_{start}$) is set at at least three step units higher than the frequency at which shutdown occurred.

3. The operating circuit of claim 2, wherein during the new attempt to ignite the lamp the prescribed minimum frequency ($F_{min}$) is set at at least one step unit higher than the frequency at which shut down occurred.

4. The operating circuit of claim 1, wherein the resonant circuit includes a lamp inductor (10) coupled between the AC voltage generator and the lamp, the lamp inductor being characterized by a saturation current.

5. The operating circuit of claim 4, wherein the threshold current value of the control circuit (12) is between 1.3 times and 2.5 times the saturation current of the lamp inductor (10) at room temperature.

6. The operating circuit of claim 1, wherein the gradual lowering of the frequency is performed stepwise with step widths of between 0.2% and 1% of the resonant frequency of the resonant circuit.

* * * * *